Jan. 10, 1939.  W. DUBILIER  2,143,369
METHOD OF MAKING ELECTRICAL CONDENSERS
Filed June 6, 1934

INVENTOR
WILLIAM DUBILIER
BY
ATTORNEY

Patented Jan. 10, 1939

2,143,369

UNITED STATES PATENT OFFICE 2,143,369

METHOD OF MAKING ELECTRICAL CONDENSERS

William Dubilier, New Rochelle, N. Y., assignor to Cornell-Dubilier Corporation, New York, N. Y., a corporation of New York Application June 6, 1934, Serial No. 729,207

1 Claim. (Cl. 175—41)

The present invention relates to electrical condensers and more particularly to condensers of small capacity as used in radio receiving circuits and the like.

The invention has for its object to provide a simple and inexpensive unitary member which serves as a combined terminal, shield, clamp, and/or an armature for the condenser. This unitary member is preferably made of a flexible wire, one end portion of which is flattened and shaped or bent to present a large contact or electrode surface, respectively, and to hold the condenser parts under compression and provide a compact and rigid condenser unit. The round or unflattened portion of the member projects outward from the condenser body and provides a conductive terminal by which the connection may be conveniently made to an outside circuit.

Other objects and advantages will hereafter appear.

For the purpose of illustrating my invention, a few embodiments thereof are shown in the drawing, in which Figure 1 shows one form of a combined terminal, clamp, and/or electrode structure according to the invention in a preliminary step of construction.

Similar reference numerals identify similar parts throughout the different views of the drawing.

Figure 1:
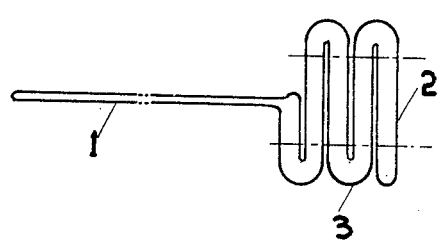

Referring to Figure 1, I have shown a unitary clamp and/or electrode member for an electrical condenser in accordance with my invention comprising a wire 1, preferably a flexible wire, having a flattened-out end portion 2 bent backward and forward at right angle to the non-flattened portion in S-fashion, as shown, to present a large contact and/or electrode surface.

Figure 2:
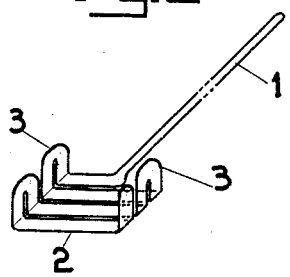
Figure 2 shows the member according to Figure 1 bent for assembly with the condenser.

Figure 2 shows the same member in a subsequent step of construction with the opposite sides 3 of the flat portion bent upward along the dotted lines as shown in Figure 1 at right angles to the surface of the flat portion.

Figure 3:
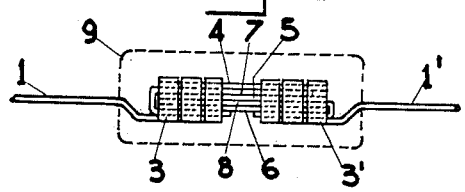
Figure 3 shows a condenser of known design with interleaved metallic and dielectric sheets and embodying a combined terminal clamp member shown by Figures 1 and 2.

Referring to Figure 3, I have shown a condenser assembly embodying a pair of combined terminal and clamp members as shown by Figures 1 and 2. The condenser shown is comprised of interleaved dielectric layers, such as sheets of mica, 4, 5 and 6 and metallic layers, such as sheets of tin foil, 7 and 8. The metallic foils extend at opposite ends of the condenser stack beyond or outside of the dielectric layers and these extended portions are bent reversely over the outside of the condenser body at opposite ends in accordance with well known methods in the manufacture of electrical condensers. While I have shown one pair of metal foils of greatly enlarged thickness for the sake of better illustration, it is understood that any desired number of conductive and dielectric sheets may be stacked upon each other and connected in accordance with well known methods in condenser construction. The thus obtained condenser stack is then placed in a pair of combined clamp and terminal members, as shown by Figure 2, with the doubled-over foil being in contact with the flat portion 2 of the clamping member, whereupon the bent-up side portions 3 and 3', respectively, are clamped down upon the condenser stack to secure sufficient contact between the clamp and the overlapping foil ends and to obtain a compact mechanically rigid unit. The condenser unit may then be mounted in a suitable casing, preferably in a molded casing indicated at 9 well known in the art, with the flexible wires 1 and 1' extending beyond the condenser body adapted to serve for various conditions for mounting and connecting the condenser in an electrical circuit such as in a radio receiving apparatus.

In the remaining figures I have furthermore shown the use of a wire member as described serving both as a clamp and armature of the condenser and as a terminal means for making condensers of small capacity as used extensively in radio receiving circuits.

Figure 4:
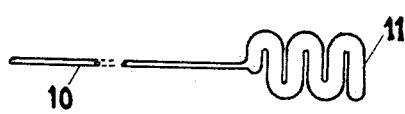
Figure 4 illustrates a combined terminal and electrode member to be used together with the member shown by Figures 1 and 2 for making a condenser of small capacity.
Figure 5:
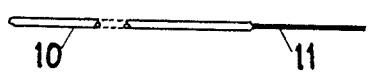
Figure 5 is a side view of Figure 4.

Referring to Figures 4 and 5, these illustrate a similar member as shown by Figure 1 comprising a wire 10 and a flattened out end portion bent in a manner similar to Figure 1 to present a flat surface acting as one armature for the condenser with a member shown by Figures 1 and 2 being used as a second cooperating electrode for the condenser, as will be described in more detail hereafter.

Figure 6:
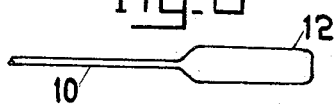
Figure 6 shows a modified electrode and terminal member according to the invention.

Alternatively, Figure 6 shows another modification in which the end portion of the wire is flattened out sufficiently to provide a flat electrode surface without bending as shown by Figure 4.

Figure 7:
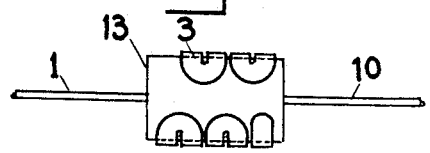
Figures 7 and 8 represent respectively, a top and a side view of a condenser using elements according to Figures 1, 2 and 4 or 6 as combined electrode and terminal members for the condenser.
Figure 8:
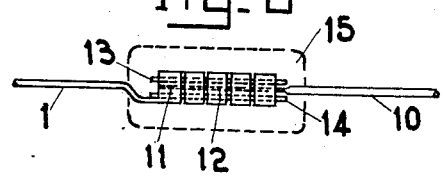

I have furthermore shown in Figures 7 and 8 a condenser comprised of a member as shown by Figures 1 and 2 serving as one armature and a member shown by Figures 4 or 6, respectively, serving as the opposite armature of the condenser. For this purpose a sheet of insulation, such as of mica, 14 is first placed over the flat part 2 of the member as shown by Figure 2, and then a member shown by Figures 4 or 6 is placed upon the mica sheet with its round wire portion 10 extending in the opposite direction to the wire portion 1 of the first electrode member. A second dielectric sheet 13 is then placed upon the portion 11 or 12, respectively, of the second electrode member and the side portions 3 of the first electrode member clamped down to secure a solid and rigid structure in a manner as in the case of an ordinary condenser stack as shown in Figure 3.

Figure 9:
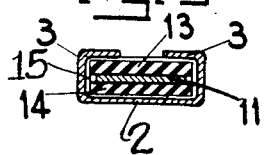
Figure 9 is a cross-section of a condenser showing the arrangement of the elements in a condenser according to Figures 7 and 8.

Figure 9 shows the arrangement of the combined clamp and armatures and dielectric sheets. The capacity of the condenser can easily be varied by either varying the size of the flattened portion 11 or 12 of one of the electrode members or by arranging portions 11 or 12 so as to cover more or less of the surface 2 of the first electrode.

Figure 11:
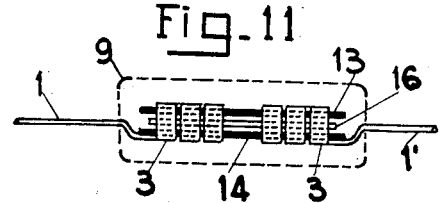
Figures 10, 11 and 12 illustrate an alternative arrangement similar to Figures 7 to 9 for making the condensers of very small electrical capacity in accordance with the invention.
Figure 10:
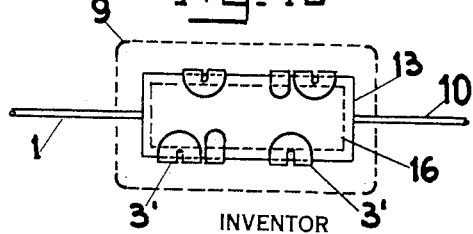
Figure 12:

If very small capacities are desired whereby the size of the flat portion 11 or 12, or the effective surface acting as a condenser armature would become very small, resulting in an impairment of the rigidity and mechanical strength of the condenser structure, an alternative arrangement may be used in accordance with a further feature of the invention as shown by Figures 10 to 12. The latter show a condenser construction using a pair of members of the type as shown by Figure 2, placed side by side with the wire terminals 1 and 1' extending in opposite directions. The condenser further comprises a pair of dielectric sheets 13 and 14 placed over the flat portions 2 of the clamping and electrode members and a free or floating electrode 16 interposed between the dielectric sheets 13 and 14. The upturned sides 3 of the electrode and clamp members are then again clamped down as shown for obtaining a rigid condenser structure which may be mounted in a casing or molding in a manner similar as mentioned before. In this manner, the equivalent of two condensers is obtained connected in series and resulting in a correspondingly decreased capacity, as is readily understood.

According to a further feature, metallic foil may be wrapped around the assembly comprising the electrode 11 and the dielectric sheets 13, 14 before applying the other electrode in a manner as at 15 in Figure 9 in order to secure more efficient hold and preventing slipping of the outer electrode or clamp 2.

Although I have shown and described a specific embodiment of my invention, it is understood that the same is susceptible to many modifications, such as in size, shape and arrangement of the parts, without departing from the spirit of my invention or the scope of the appended claim.

I claim:

In an electrical condenser, a pair of insulating plates; a metallic sheet interposed therebetween; and a pair of wire members having flattened-out end portions bent backward and forward in S-fashion to present a large surface, said flattened end portions being bent and clamped around at opposite ends of said insulating sheets to act as combined electrode and clamp members for the condenser with said first metallic sheet as a floating layer; and a molded casing for the condenser with the non-flattened portions of said wire members protruding beyond the condenser body to act as terminal conductors for the condenser.

WILLIAM DUBILIER.